United States Patent [19]

McNair et al.

[11] Patent Number: 5,423,246
[45] Date of Patent: Jun. 13, 1995

[54] FLAMEPROOF TOASTER COVER

[75] Inventors: John D. McNair, Olinda; Gerard P. Gilliland, Ferntree Gully, both of Australia

[73] Assignee: Black & Decker Inc., Newark, Del.

[21] Appl. No.: 252,870

[22] Filed: Jun. 2, 1994

[30] Foreign Application Priority Data

Jun. 3, 1993 [AU] Australia ............ PL9158

[51] Int. Cl.⁶ ............................................. A47J 37/08
[52] U.S. Cl. ............................ 99/334; 99/337; 99/385; 99/391; 99/393
[58] Field of Search .................. 99/326–328, 99/329 R, 329 P, 329 RT, 334, 335, 339, 340, 389–393, 385, 399, 345, 401, 402; 219/521, 537, 386, 413

[56] References Cited

U.S. PATENT DOCUMENTS

| | | | |
|---|---|---|---|
| 2,091,041 | 8/1937 | Hallwood | 99/391 |
| 2,497,205 | 2/1950 | Brewton | 99/391 |
| 3,298,300 | 1/1967 | Grebow et al. | |
| 3,636,858 | 1/1972 | Praskerson | |
| 3,760,713 | 9/1973 | Sato | |
| 3,789,749 | 2/1974 | Paaskesen | 99/391 |
| 4,254,695 | 3/1981 | Landry | |
| 4,397,227 | 8/1983 | Landry | |
| 4,404,899 | 9/1983 | Weiss | |
| 4,972,768 | 11/1990 | Basora San Juan | 99/393 X |
| 5,181,455 | 1/1993 | Masel et al. | |
| 5,216,944 | 6/1993 | Trujillo | |

OTHER PUBLICATIONS

Patent Abstract-Australian Patent Office-AU-A-44335/93–15 pages, Aug. 25, 1992.

*Primary Examiner*—Timothy F. Simone
*Attorney, Agent, or Firm*—Barry E. Deutsch

[57] ABSTRACT

A cover for a toaster capable of retaining flame from a fire within the body of the toaster. The cover comprises a first wall adapted to overlie an access opening to a toaster compartment within the toaster, the first wall having a plurality of slot-like apertures formed therein with a second member partially or fully overlying each slot-like aperture but being located in a plane spaced from that of the first wall. The slot-like apertures are disposed transversely to a longitudinal axis of the toasting compartment whereby flame within the toasting compartment is substantially prevented from passing through the cover but convection heat from within the toasting compartment is capable of passing through the slot like apertures.

12 Claims, 3 Drawing Sheets

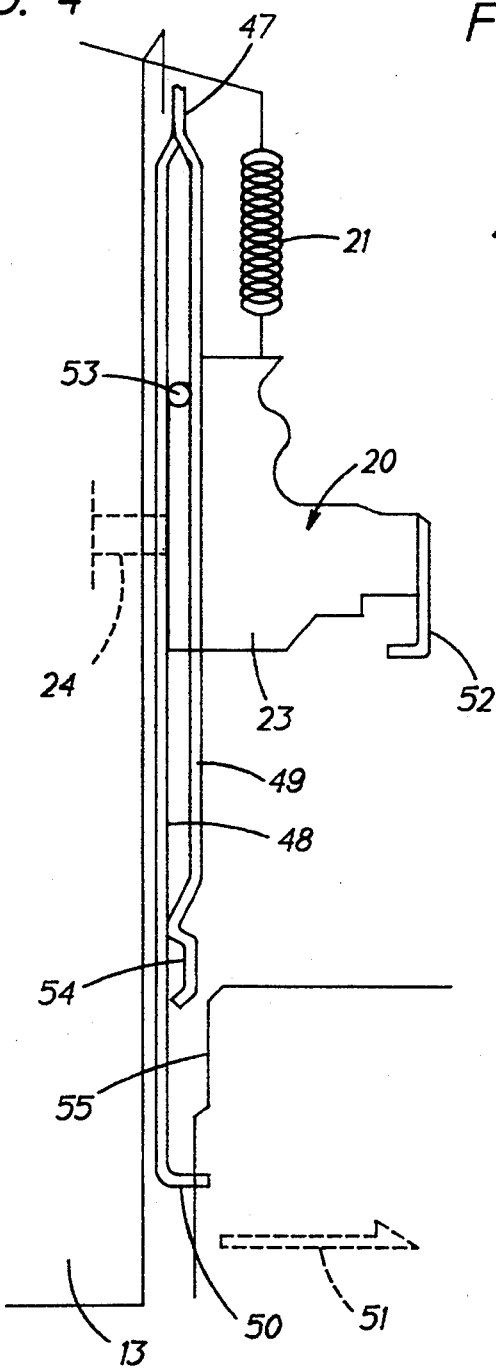
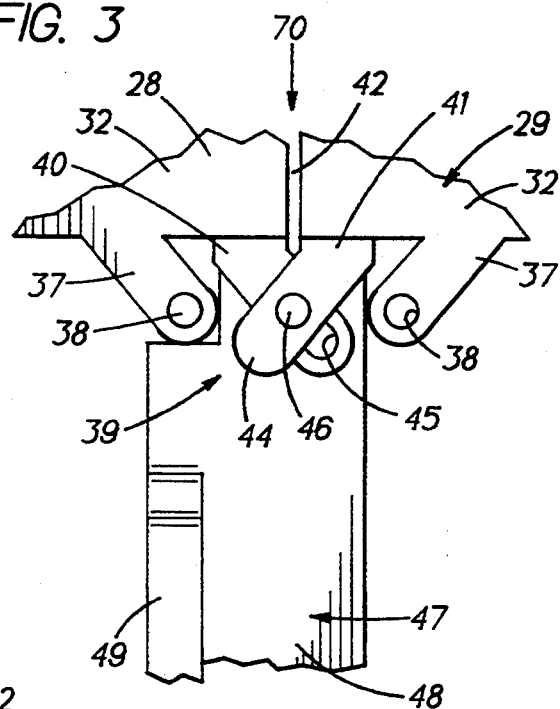
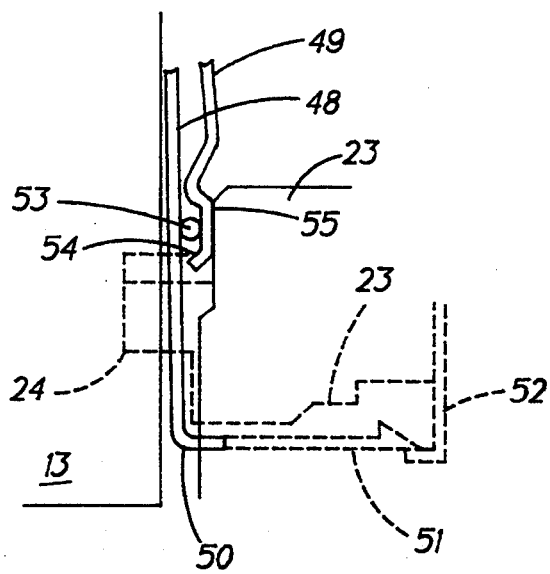
FIG. 4
FIG. 3
FIG. 5

FLAMEPROOF TOASTER COVER

BACKGROUND OF THE INVENTION

The present invention relates to improvements in toasters, particularly those toasters with one or more upwardly open slots to receive a product such as a slice of bread, a crumpet, a muffin or the like to be toasted.

Although not very common, fires can occur when toasters are utilized. The cause of such fires include (1) a build up of crumb material in the toaster base; and (2) a food product being toasted for a period of time that exceeds the normal level for that product due to operator misuse or a malfunction in the toaster itself.

In U.S. patent application Ser. No. 08/146,251 filed Nov. 1, 1993 and assigned to the same assignee as the assignee hereof there is disclosed a toaster of the kind in which one or more upwardly open slots are provided to receive a product to be toasted. In this patent application there is also disclosed a single pivotal (flameproof) flap or two such flaps adapted to close or open the upper access slot or slots of the toaster. While these arrangements are satisfactory from the point of view of containment of a possible fire within the toaster, they do have a practical disadvantage, particularly when relatively narrow body single slot toasters are used. The heat within a toaster body is created by toasting or heating elements and the toasting effect is primarily generated by radiant heat from these elements. The elements also, however, create convection heat most of which normally escapes through the upper open access slot during operation of conventional toasters of this design. If, however, a cover flap closes the upper access slot during a toasting cycle most of the convection heat is retained within the toasting compartment thereby significantly affecting toasting performance and possibly harming toaster componentry as a result of the increased retained heat levels in the toaster. While the problem might be partially improved by lowering the wattage levels of the toaster heating elements, it has been found difficult to lower the wattage levels sufficiently to solve the problem of retained convection heat levels while at the same time maintaining sufficient radiant heat capability to provide a reasonable toasting performance. The problem becomes more serious upon decreasing the body width of the toaster and also when it is desired to maintain a cool touch to the outer walls of the toaster.

Accordingly it is an objective of the present invention to provide a means of permitting the escape of convection heat from a toaster of the type disclosed in the foregoing while still providing a means of preventing escape of flames from the toasting compartment in the unfortunate event of a toaster fire occurring. As a result, the invention also aims at being able to keep heating element wattage levels at a value sufficient to provide good radiant heat performance and thereby good toasting performance.

SUMMARY OF THE INVENTION

Accordingly, the present invention provides a cover member adapted in one position of use, to form part of an enclosure for a toasting chamber in a toasting device so as to prevent escape of flame therefrom but allow escape of convection heat from the toasting chamber, said cover member in said one position of use being locatable above a possible flame source in said toasting chamber, said cover member being perforated by at least one aperture extending through the cover member, and at least a second non-perforated member being provided overlying at least part of each said aperture and located in a plane vertically spaced from each said aperture. In this manner convection heat may escape from the toasting chamber through the cover member but flame is inhibited or prevented from passing outwardly of the toasting device. Conveniently the second non-perforated member covers at least 50% of the apertures in the cover member. The second non-perforated member might be a single element covering a number of apertures or a separate member for each aperture. A particularly preferred form of producing the aforesaid apertures is to form by punching or by some other metal deformation process, a plurality of slot like openings with the metal of said slot like openings forming the second member overlying the aperture and connected to the cover member by end tab means. By this means no additional metal is required and no additional machining or assembly is required beyond the one step punching operation.

It has been generally observed that flames from a fire within a narrow width toasting chamber tend to be constrained to run mostly parallel with the longitudinal walls of the toasting chamber. As a result, it is desired to dispose any apertures in the cover member transverse to the longitudinal walls of the toasting chamber. Conveniently such apertures are in the form of slots arranged at an angle of between 90° and 20° to the longitudinal direction. Preferably, the apertures comprise between 30 and 60% of the area of the cover member. Preferably the area between the second member and the cover member is at least 30% of the area of the cover member and is preferably no less than the total area of the apertures in said cover chamber.

The present invention also anticipates the use of one or more cover members as described above in a toaster device. In accordance with this aspect, the present invention provides a toaster having at least one upwardly facing opening to enable a product to be toasted to be introduced therethrough so as to be received in a toasting chamber below said opening, and a cover member adapted, in one position of use, to form part of an enclosure for the toasting chamber so as to prevent escape of flame from said toasting chamber through said cover member, said cover member further being perforated by at least one aperture extending through the cover member, and a second non-perforated means being provided overlying at least part of each said aperture, said second non-perforated means being located in a plane vertically spaced from each said aperture.

It has been observed that fire within toasters of the type having an upwardly facing access slot, tend to evolve in the longitudinal direction of the toasting chamber and will pass through any cover having upwardly facing openings. A number of types of materials have been tried in this regard including metal mesh, perforated metal sheet and spaced double layers of such materials. These have not been found satisfactory in practice. The aforementioned tendency appears to increase when any such openings are directed longitudinally of the chamber. It has, however been surprisingly found that if each upward directed opening is covered or partially covered by a spaced second member, then the tendency for flame penetration through the cover decreases to a very marked extent. Furthermore, placing slot openings transverse to the longitudinal direction of the toasting chamber, also decreases the tendency for flame to penetrate the cover member.

Conveniently the cover member is movable between one position in which the cover member at least partially overlies said slot opening and a second position wherein said cover member allows free access through said slot opening. Preferably two said cover members are provided and wherein in said one position said cover members are arranged side by side to fully overlie said slot opening. In one preferred arrangement a plurality of said apertures are provided in each said cover member, each said aperture being in the form of a slot aperture with the direction of said slot apertures being transverse to a longitudinal direction of the toasting chamber. Preferably in a second position of each cover member, the cover member is located within the confines of an outer housing of the toaster.

In a still further preferred embodiment at least two said cover members are provided as aforesaid, each said cover member having depending skirt members arranged in use in said one position to depend downwardly and outwardly of said toasting chamber.

Conveniently operating means is provided connected to said cover members to move said cover members between said one position and said second position. Preferably, said operating means moves said cover members in response to movement of a product support carriage in said toasting compartment, said operating means acting to move said cover members to said one (or closed) position when said product support carriage has moved through at least 70% and preferably between 85 and 95% of its permitted travel from its upper limit. Advantageously the operating means moves said cover members to said second (or open) position within 0 to 15% of the permitted travel of the product support carriage from the bottom toasting position of the support carriage. Conveniently, the cover members commence moving to their second (or open) position immediately the product support carriage starts to move upwardly.

A preferred embodiment of the present invention will hereinafter be described with reference to the accompanying drawing.

BRIEF DESCRIPTION OF THE DRAWING

FIG. 1a is a partial cross-sectional view taken along the A—A of FIG. 1;

FIG. 3 is an end elevation view of an upper part of the mechanism shown in FIG. 2;

FIG. 4 is a side elevation view of a lower part of the mechanism shown in FIG. 2; and FIG. 5 is a view similar to FIG. 4 showing the mechanism in a different position of use.

DESCRIPTION OF THE PREFERRED EMBODIMENT

Figure 1:
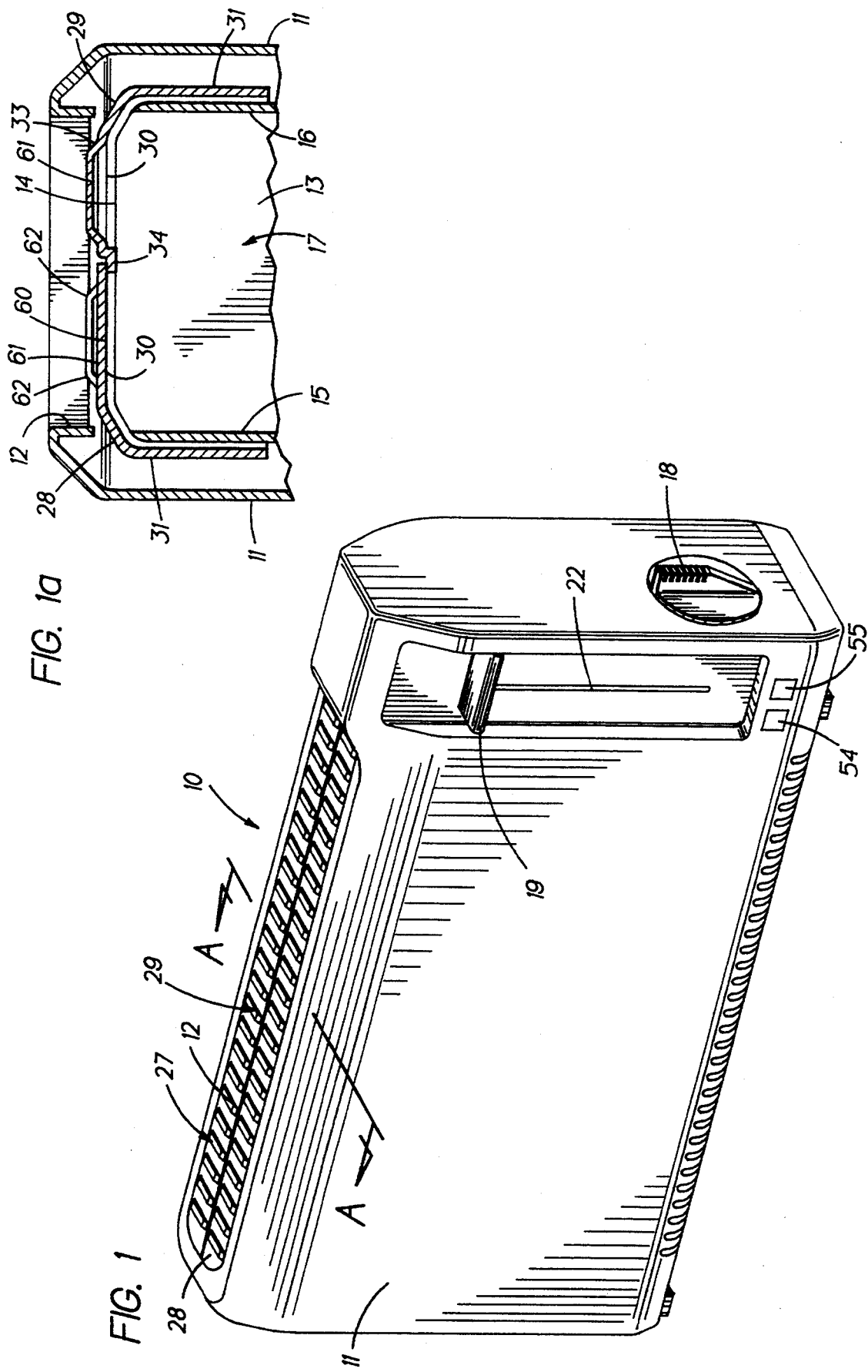
FIG. 1 is a perspective view of a toaster according to the present invention.
Figure 2:
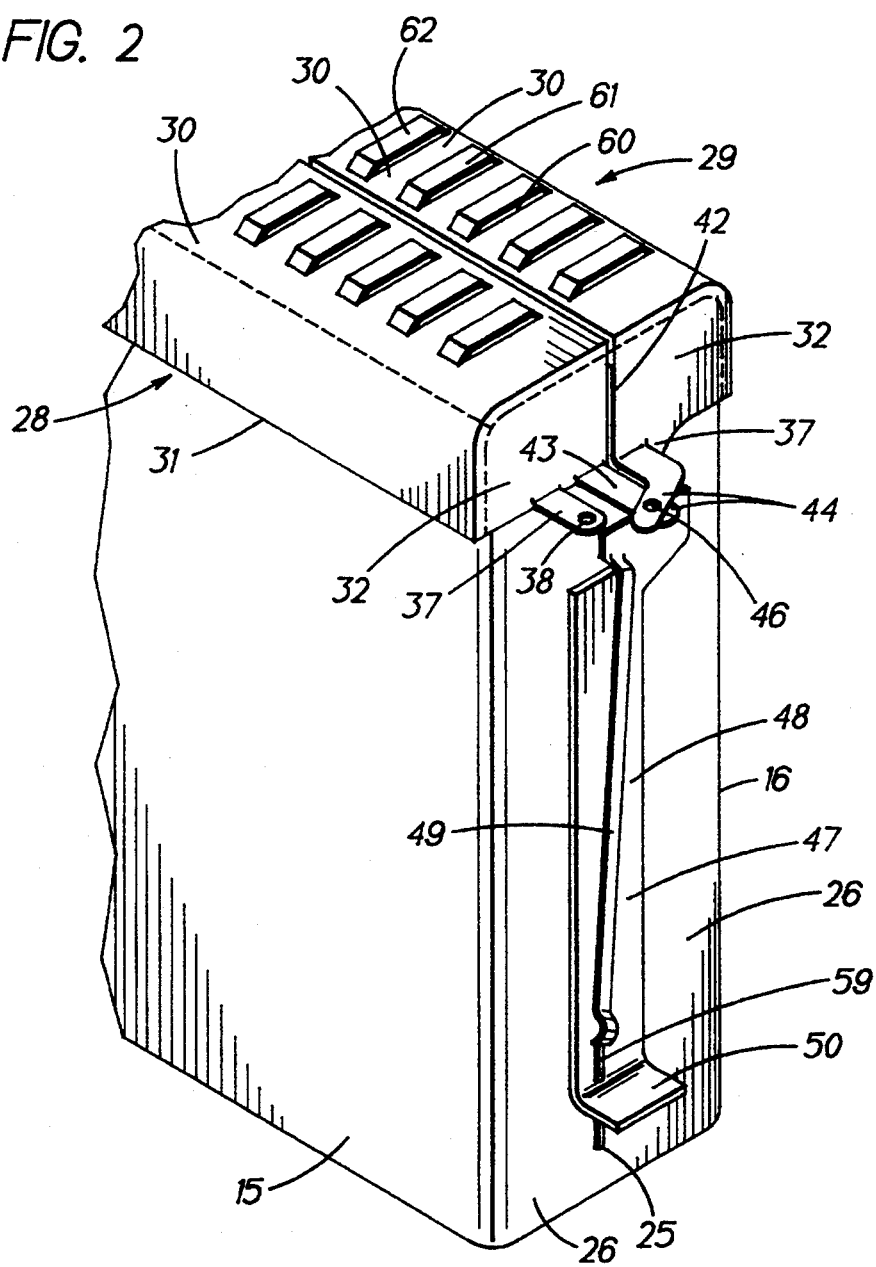
FIG. 2 is a partial perspective view of one end of the toasting compartment of the toaster of FIG. 1 with the outer casing and other parts removed for the sake of clarity.

Referring now to the drawing, FIG. 1 shows a toaster 10 with an outer casing 11 (preferably formed from a non-burnable plastics material, metal or the like) having an upper access slot 12 adapted to receive a product to be toasted and to ultimately eject a toasted product therethrough after completion of a toasting cycle. As can be seen in FIGS. 1a and 2, an inner enclosure 13 is provided (conveniently produced from sheet metal) within the outer casing 11. The inner enclosure also has a generally rectangular upper access opening 14 substantially aligned with the access slot 12 in the outer casing. The inner enclosure 13 defines a toasting compartment 17 with electrical heating elements of any known configuration (not shown) located adjacent the inner face of each longitudinal side wall 15,16 directing radiant and convection heat inwardly of the toasting compartment 17 when energized. A control knob 18 is connected to any known or conventional means for selecting adjustment of the "brownness" of the product being toasted or selecting the length of the toasting cycle. A second operator gripping member 19 is provided which is directly connected to a product support carriage 20 located at least partially within the toasting compartment 17. The product support carriage is mounted on a vertical slide post (not shown) so that it is capable of movement upwardly and downwardly thereon. A spring 21 is provided to normally urge carriage 20 upwardly but against which an operator can move carriage 20 down to a lowered toasting position by gripping member 19 and moving same downwardly in slot 22 in outer casing 11. The product supporting carriage 20 has a part 23 located downwardly of toasting chamber 17 and a part 24 located within the toasting chamber on which a slice of bread or the like is supported during a toasting cycle. Part 24 extends through a vertical slot 25 in an end wall 26 of inner enclosure 13.

As shown in FIGS. 1, 1a, 2 and 3, a closure means 27 is provided arranged to overlie access openings 12,14 to toasting compartment 17. In the preferred embodiment illustrated, the closure means is conveniently located generally between outer casing 11 and inner enclosure 13 and comprises a pair of cover members 28,29. In a possible alternative arrangement the closure means may be formed as a single outwardly pivoting cover member or flap as shown for example in previously noted U.S. patent application Ser. No. 08/146,251. Any other possible form of cover member could also be employed with the performance of the present invention. In the embodiment illustrated in the drawing, each cover member 28,29 comprises an upper plate 30 covering approximately half of access opening 14 when closed, a longitudinally extending side plate 31 adapted to extend downwardly from access opening 14 outwardly of one of the inner enclosure side walls 15, 16 and a pair of end plates 32,33 adapted to extend downwardly and outwardly of the end walls of inner enclosure 13. One of the cover members 28,29 preferably has an inwardly (or outwardly) located laterally extending lip 34 adapted to overlie the small longitudinally extending space between cover members 28,29 when closed as illustrated in FIG. 1a. Conveniently, if cover members 28,29 are to be identically shaped (as may be desirable for manufacturing purposes) lip 34 may extend over only half the length of the cover member 28 or 29 so that in an assembly, the overlying lip extends from each cover member over half the length of the cover member with an overlying obstruction thereby extending the full length of access opening 14. By this means, escape of flame is prevented from toasting chamber 17 between cover members 28,29.

An operating mechanism 70 for moving cover members 28,29 from the generally closed (illustrated) position to an open position is best seen in FIGS. 2 to 5 of the annexed drawing. Each end plate 32,33 of the cover members has a downwardly depending hinge plate member 37 so as to locate a fixed hinge connection 38 to an end wall 26 of inner enclosure 13 downwardly of the lower edge of cover members 28,29 and outwardly spaced from central dividing line 42 between cover members 28,29. In addition a floating hinge connection 39 is provided acting between the two cover members 28,29. The floating hinge connection is formed by tab members 40,41 located at the lower edge of members 28,29 adjacent dividing line 42 between cover members 28,29. Each tab member 40,41 has a first portion 43 (see FIG. 2) extending outwardly from and at the same level as the lower edge of the cover member and a second portion 44 extending downwardly and towards or across dividing line 42. One or both of the portions 44 includes a slot 45 and a hinge pin 46 extends through portion 44 connecting same together with a downwardly directed link member 47. Movement of the link member 47 downwardly or upwardly causes the hinge pin 46 to move downwardly or upwardly. As a result the cover members pivot about hinge pins 38 and also tend to move outwardly when opening or inwardly when closing because of the floating hinge 39 caused by each slot 45. Thus cover members 28,29 can be arranged to completely close access opening 14 to inner enclosure 13 (when closed), or open this access opening 14 with cover members 28,29 moving to a position between outer casing 11 and inner enclosure 13.

The operating link member 47 is divided along most of its length from its lower end to form a first part 48 and a second part 49. The first part 48 has a lateral tab 50 at its lowermost end which is engaged by carriage part 23 on its downward travel near to the end of its downward travel and in so doing the final downward movement of carriage part 23 drags with it link member 47 and thereby pivot pin 46 to close cover members 28,29. FIG. 4 shows carriage part 23 at its uppermost position whereas FIG. 5 shows carriage part 23 at its lowered toasting position. In the lowered toasting position, carriage part 23 has been stopped by a physical limit ledge 51 and a manual latch member 52 has been engaged to prevent carriage part 23 from moving upwardly from the position shown in FIG. 5 whether or not a toasting cycle has been completed. Moreover in the lowered toasting position (FIG. 5), a dowel pin 53 carried by carriage part 23 is engaged in a recess 54 formed in the lower end of second part 49 of the link member 47 and is locked therein by fixed cam ledge 55. Thus when carriage part 23 is moved upwardly at the end of a toasting cycle and after delatching member 52, dowel pin 53 drives second link part 49 upwardly (and thereby link member 47 and hinge pin 46) to immediately open the cover members upon carriage 20 starting its upward eject motion. A slot 59 is formed in part 48 of link member 47 and carriage part 24 extends through this slot 59 and slot 25 into the toasting chamber 17. Carriage part 24 through spring 21 keeps link 47 in its up position in the absence of external manipulation. As will be apparent from the foregoing, latch member 52 and latch ledge 51 form an automatically engaged manual latch which must be manually delatched to enable cover members 28,29 to be opened and necessarily requires the attention of a person at the toaster when this event occurs. Thus in an unlikely event of a fire having ignited in the chamber, cover members 28,29 will not have been automatically opened by the toaster mechanism (when unattended by the operator) thereby allowing flames to escape from toasting chamber 17. Conveniently, to assist operation of the toaster, visual and/or audible indicators 57, 58 may be provided to show that a toasting cycle has commenced and separately has been completed. Although the foregoing description has been given with reference to a toaster having a carriage 23 moved manually down and a spring 21 to eject the toasted product, it should of course be appreciated that any known mechanism for driving or moving carriage 20 might also be employed.

As is best seen in FIGS. 1, 1a and 2, each cover member 28,29 includes a plurality of slots 60 formed in upper wall 30 of each member. Slots 60 are preferably formed by a punching technique so that the metal 61 formerly within the slot is displaced out of the plane of the wall 30 to be held overlying the slot 60 thus formed, by end tabs 62 connecting the part 61 to the remainder of the wall 30. Preferably the slots are arranged generally perpendicular to walls 15,16 of toasting chamber 17 or alternatively at an angle of between 90° and 30° to walls 15,16. Conveniently the metal forming the part 61 is spaced by between 0.5 and 1.5 mm from the adjacent surface of the wall 30. Preferably the length of slots 60 are between 10 and 25 mm. Preferably the spacing between adjacent slots is between 1.5 and 5 mm, preferably about 3 mm. Conveniently the width of each slot is between 1.5 and 5 mm, preferably about 3 mm.

While a preferred embodiment of the present invention has been described and illustrated, the invention should not be limited thereto but may be otherwise embodied within the scope of the following claims.

We claim:

1. A cover member forming, in one position of use, part of an enclosure for a toasting chamber in a toasting device so as to prevent escape of flame therefrom but allow escape of convection heat from the toasting chamber, said cover member in said one position of use being locatable above a possible flame source in said toasting chamber, said cover member being perforated by at least one aperture extending through the cover member, and a second non-perforated member being provided overlying at least part of each said aperture and located in a plane spaced vertically from said aperture.

2. A cover member according to claim 1 wherein the second member overlies at least 50% of the area of said apertures in said cover member.

3. A cover member according to claim 2 wherein a single said second member overlies a plurality of said apertures.

4. A cover member according to claim 2 wherein said second member at least partially overlies each said aperture.

5. A toaster having at least one upwardly facing slot to enable a product to be toasted to be introduced therethrough so as to be received in a toasting chamber below said slot and a cover member forming, in one position of use, part of an enclosure for the toasting chamber so as to prevent escape of flame from said toasting chamber through said cover member, said cover member further being perforated by at least one aperture extending through the cover member, and a second non-perforated means being provided overlying at least part of each said aperture, said second non-perforated means being located in a plane spaced vertically from each said aperture.

6. A toaster according to claim 5 wherein the second non-perforated means overlies at least 50% of each said aperture.

7. A toaster according to claim 6 wherein the cover member is movable between said one position in which the cover member at least partially overlies said slot opening and a second position wherein said cover member allows free access through said slot opening.

8. A toaster according to claim 7 wherein two said cover members are provided and wherein in said one position said cover members are arranged side by side to fully overlie said slot opening.

9. A toaster according to claim 5 wherein a plurality of said apertures are provided in said cover member, each said aperture being in the form of a slot aperture with the direction of said slot apertures being transverse to a longitudinal direction of the toasting chamber.

10. A toaster according to claim 9 wherein the slots are arranged at an angle of 90° to the longitudinal direction of the toasting chamber.

11. A toaster according to claim 9 wherein the slots are arranged at an angle of between 20° and 90° to the longitudinal direction of the toasting chamber.

12. A toaster according to claim 9 wherein each said slot aperture is formed by separating a portion of said cover member along two adjacent lines and deforming material of said cover member between said lines out of the plane of said cover member, said material of said cover member between said lines forming said second non-perforated means.

* * * * *